Jan. 14, 1964 K. H. MORGANSTERN 3,117,754
VEHICLE IDENTIFICATION SYSTEM
Filed April 21, 1959 2 Sheets-Sheet 1

INVENTOR
KENNARD H. MORGANSTERN

BY *Hurvitz & Rose*

ATTORNEYS

Jan. 14, 1964     K. H. MORGANSTERN     3,117,754
VEHICLE IDENTIFICATION SYSTEM
Filed April 21, 1959     2 Sheets-Sheet 2
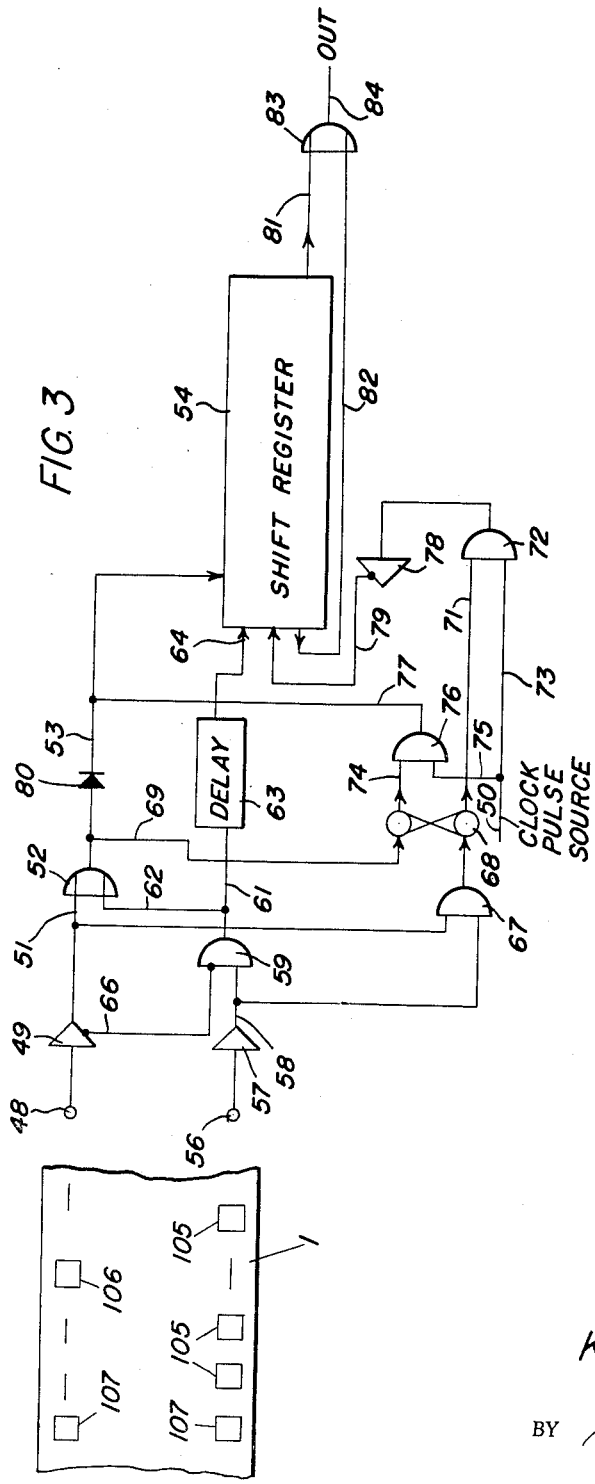
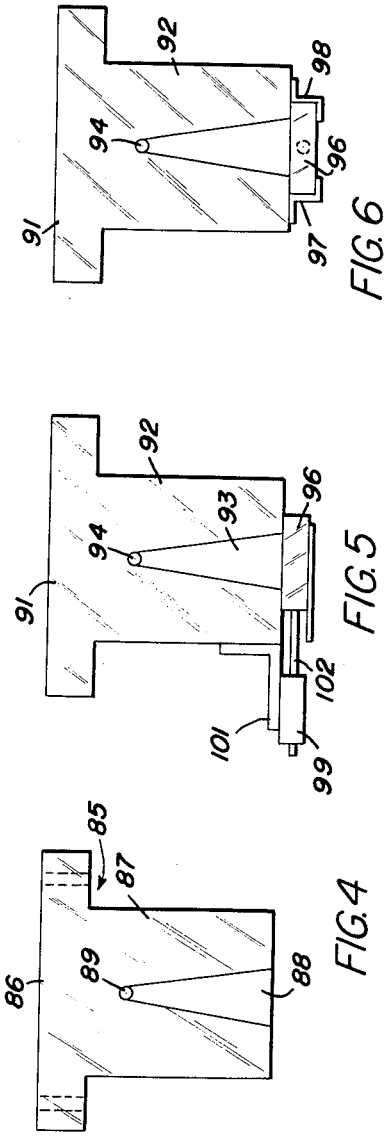
INVENTOR
KENNARD H. MORGANSTERN
BY Hurvitz + Rose
ATTORNEYS United States Patent Office 3,117,754
Patented Jan. 14, 1964

3,117,754
VEHICLE IDENTIFICATION SYSTEM
Kennard H. Morganstern, Roslyn, N.Y., assignor to Radiation Dynamics, Inc., Westbury, N.Y., a corporation of New York
Filed Apr. 21, 1959, Ser. No. 807,965
12 Claims. (Cl. 246—2)

The present invention relates to identification systems and apparatus and more particularly to systems and apparatus for uniquely identifying vehicles upon their passage adjacent a predetermined location.

Although the present invention is applicable to all classes of vehicles it is particularly applicable to the identification and classification of railroad cars, particularly upon entering a freight yard. In making up new trains from freight cars available in the freight yard and in diverting freight cars of incoming trains to proper unloading stations or platforms, there has been an increasing reliance upon automatic equipment. For instance, and in accordance with now subsisting practice, upon the entrance of a new train into a freight yard, an individual notes the number and classification of each car in the train and this information is fed to a computer at a centralized control station within the yard. The computer, having stored therein information relating to the various trains which are being assembled, allocates each car to a particular track where it is to be unloaded, or to a track where it is to be assembled in a new train. The information provided by the computer not only indicates on what track the car shall be placed but also indicates the point at which the car is to be released by the switching engine and velocity at the time of release so that the car has sufficient momentum to traverse the required extent of rails to reach its desired location. Therefore, not only must the machine have knowledge relating to the trains being made up at the present time but must also have information relating to the weight, loaded and empty, of each particular classification of freight car available. As indicated previously, the information relating to the classification and loading condition of the car is at present provided by an individual who examines each car upon its arrival at the freight yard. The information relating to the freight cars is not only of interest with respect to assembling new trains and in dispersing old ones but is also of interest to each railroad since they desire to know the location of each of their cars at the end of each day, or week or other predetermined period. Therefore, the information relating to each unique car of each railroad must also be determined by the individual checking the incoming cars and forwarded to a central point.

It is an object of the present invention to provide an apparatus and system for readily identifying vehicles either uniquely or in accordance with their classification or both.

It is another object of the present invention to provide a system and apparatus for identifying rapidly moving freight cars upon their entry into a freight yard.

In accordance with the present invention each freight car, and this applied equally well to other vehicles, has a plurality of sources of radiation arranged in coded form along a given surface of the car. The sources are adapted to pass a particular location in a freight yard at which is disposed at least one energy detector. The information is contained by arranging the energy sources in a coded configuration, such as a binary code, by which it is possible to identify over 1,000 distinct vehicles by means of only ten possible locations of energy sources. The sources of energy may take many forms but in accordance with a preferred embodiment of the invention the sources are gamma-ray emitting materials since gamma rays are normally unaffected by weather, dirt, lighting conditions, etc. Any other type of sources, such as light, magnetism, electric field pick up, etc., are subject to external disturbances, this being particularly true of light, where dirt or snow and other conditions of weather and atmosphere may adversely affect identification. The coded information thus provided by the arrangement of sources may be employed to identify each car uniquely or identify the car as a member of a particular group or both.

The sources of energy applied to the car may be arranged to impinge upon a plurality of detectors concurrently or may be presented to a single detector serially or may be arranged as in accordance with both of these systems so that information is presented to the detectors both serially and in parallel.

It is, therefore, another object of the present invention to employ sources of radio-active emanations arranged in coded form on a moving vehicle such as to be presented to one or more radio-active detectors which in conjunction with associated circuitry may identify the car or its classification.

It is another object of the present invention to provide for the identification of railroad cars by means of radio-active sources, which sources may be completely shielded except at the times they are to be interrogated by an appropriate detector.

The above and still further objects, features and advantages of the present invention will become apparent upon consideration of the following detailed description of three specific embodiments thereof, especially when taken in conjunction with the accompanying drawings, wherein:

FIGURE 3 is a schematic block diagram of a still further embodiment of the present invention; and FIGURES 4 through 6 are cross-sectional drawings in elevation of various source containers which may be employed with the apparatus of the present invention.

Figure 1:
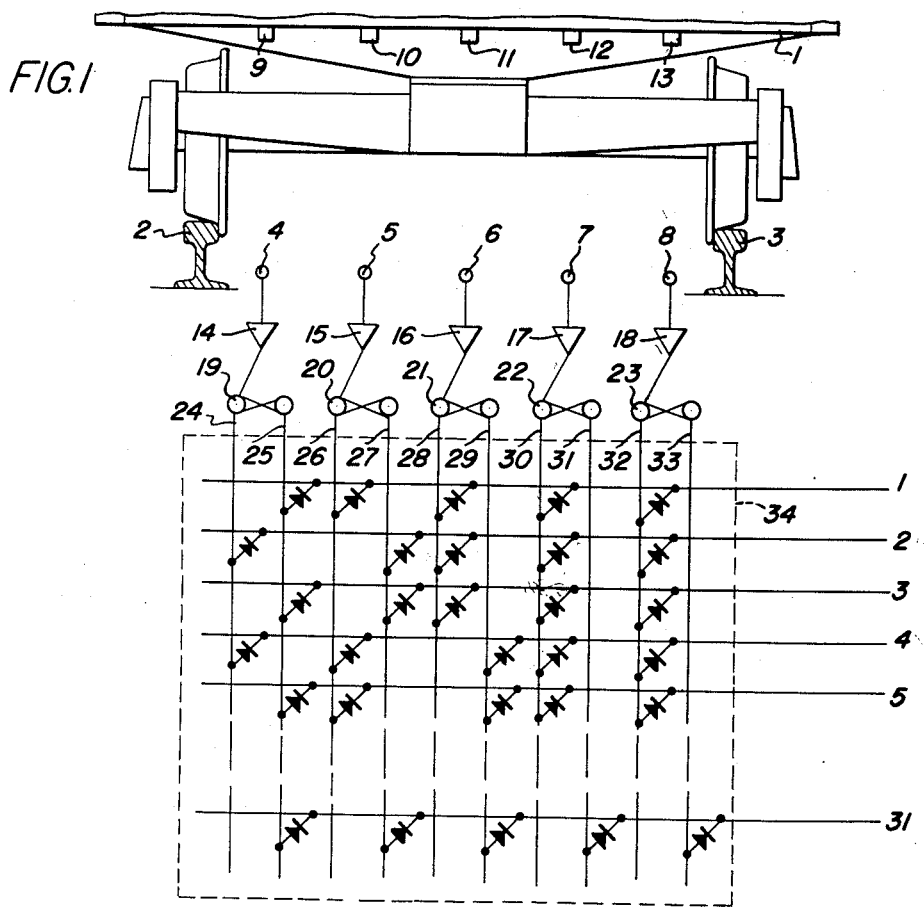
FIGURE 1 is a partial cross-sectional mechanical drawing and partial schematic wiring diagram of a system in accordance with one embodiment of the present invention.

Referring specifically to FIGURE 1 of the accompanying drawing, there is illustrated a system in accordance with the present invention for identifying each specific vehicle presented to the system. More particularly, and for purposes of example only, a railroad car 1 is adapted to travel along a pair of railroad tracks 2—3 and pass over a plurality of radiation detectors 4, 5, 6, 7 and 8 disposed under the car 1 and in the road bed of the track; preferably between the conventional ties, utilized in laying tracks. The underside of the car 1 is provided with a plurality of radiation sources 9, 10, 11, 12 and 13 which are intended to direct radiation onto the detectors 4 through 8, respectively. Collimating means are employed in each source so that the radiation produced by each of these members is directed against a radiation detector disposed immediately thereunder and is prevented from impinging upon any of the other radiation detector, as will become apparent upon description of the individual sources. Upon the passage of a car over the region of the track in which the sources 4 to 8 are disposed, radiation from each of these sources energizes its respective detector and produces a pulse which is amplified by amplifying devices 14, 15, 16, 17 and 18, respectively.

In the example illustrated all of the detectors are energized, but in accordance with the invention any permutation or arrangement of the detectors may be energized in accordance with a predetermined code, such as a binary, cyclic binary, trinary, etc., code system. In the specific example illustrated, wherein five distinct sources are employed in a binary code, 32 distinct combinations of sources are achieved but only 31 would normally be employed since the 32nd code designation would be a complete lack of sources which would convey no intelligence whatsoever to the detectors. In practice additional sources would be employed to increase the number of distinct designators available, and with proper collimating techniques and proper displacement of the sources along the under body of the car 1, as many as 20 sources and detectors may be employed which would provide over a million distinct combinations of sources. Such an arrangement would permit a distinct code to be provided for every freight car in the nation. The numbers assigned to various cars may be allocated such that all of the cars of a given type, such as cattle cars, tank cars, etc., would fall within a predetermined number group in order that not only could the individual cars be identified by the coded number but the particular type of car could readily be identified so that the objects of the present invention concerning routing of cars of specific types may be readily carried forward.

The output of each of the amplifiers 14 through 18 is fed to a different one of five flip-flops 19, 20, 21, 22 and 23, respectively, the connections between the amplifiers and the flip-flops being such that each time a pulse is applied to the amplifier, the left hand stage as viewed in FIGURE 1 becomes conductive. Each flip-flop is provided with two output leads each being connected to receive the output voltage from a different one of the conductive devices included within the flip-flop circuit. Specifically, the flip-flop 19 is provided with output leads 24 and 25, the flip-flop 20 with leads 26, 27, the flip-flop 21 with leads 28 and 29, the flip-flop 22 with leads 30 and 31 and the flip-flop 23 with leads 32 and 33. Obviously, only half of these leads have high voltage applied thereto, at any given time, indicating that their associated devices are non-conducting while the other half of the leads have a low voltage applied thereto indicating that their associated devices are conducting. If cathode follower connections are employed, the opposite voltage arrangement would be true for the aforesaid conduction pattern.

The leads 24 through 33 constitute the input leads to a diode matrix 34 enclosed within the dashed line box. The diode matrix 34 is a well-known device having a plurality of output leads designated by the binary number applied to the matrix which they represent. Thus, if the pattern of pulses applied to the flip-flops 19 through 23 indicates a binary 1; that is, a radiation source appears only in the location 9 on the left side of the car, but in no other locations, then the leads 25, 26, 28, 30 and 32 have high voltages applied thereto and the lead 1 is energized. If a binary 2 were to be indicated then a source would appear only at the code location 10 on the car 1 in which the leads 24, 27, 28, 30 and 32 would have high voltage applied thereto. As for the lead 31 this would be energized only if the pattern of sources is employed which is illustrated in FIGURE 1; that is, a source at each of the five code locations. In that case the leads 25, 27, 29, 31 and 33 would be energized, resulting in energization of the lead indicating the number 31.

It can be seen from the above that each pattern of sources on the underside of the car 1 produces energization of a distinct one of the output leads from the diode matrix 34 and therefore by providing each car with a distinct pattern of sources each individual car can be uniquely designated and readily recognized by the apparatus of the invention. It is apparent that the apparatus of FIGURE 1 permits the elimination of personnel required to examine each freight car coming into a freight yard for the purpose of identifying that car and notifying the station master's office of its arrival. At the same time the same general arrangement can incorporate circuitry which makes the information readily presentable to an electronic computer for processing.

Figure 2:
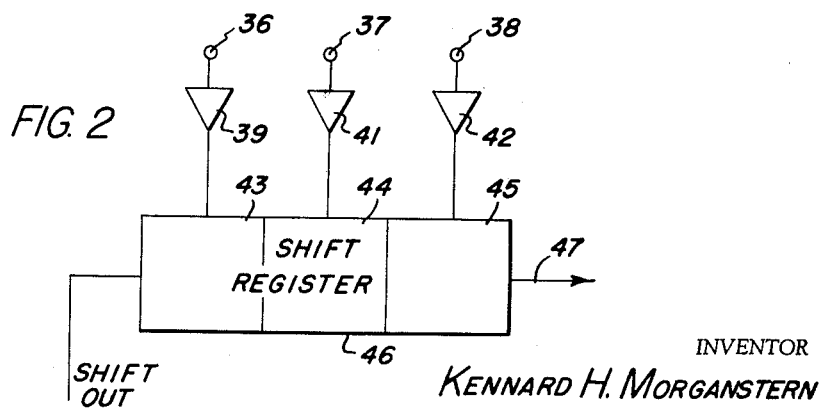
FIGURE 2 is a schematic block diagram of a second embodiment of the present invention.

In accordance with the schematic diagram of FIGURE 2, a plurality of radiation detectors 36, 37 and 38, only three being employed for the purposes of example, are arranged perpendicular to the tracks which the freight car is travelling so that they are more or less simultaneously energized by sources disposed on the underside of the car. The pulses developed by the detectors 36, 37 and 38 are fed through amplifiers 39, 41 and 42, respectively, to distinct stages 43, 44 and 45, respectively, of a shift register 46. After the passage of each car, the information in the shift register is shifted out serially onto an output lead 47 which if shifted at the operating rate of a computer may present the information directly to a computer adapted to process the information stored in the shift register 46. Conversely, if a serial arrangement of sources is employed, a shift register may be utilized to convert to a parallel code.

The utilization of an arrangement of sources which extend generally perpendicular to the track, even though they may be arranged in a stairstep fashion to avoid interaction of the sources on various detectors, presents several problems in that the number of sources which can be located on the car is limited by spacing requirements between sources and the width of the car on the one hand and that a plurality of detectors and subsequent amplifiers and decoding matrices must be employed which greatly increases the cost of the system. The advantage to the parallel channel arrangement provided by FIGURE 1, lies in the fact that there are no timing problems since all information is received concurrently and there are no problems concerning the fact that a number might begin or end in a zero which complicates the system. The difficulties encountered with timing and words or codes beginning in zeros can be appreciated by the following example. The binary numbers 7, 14 and 28 all include within a five bit code, three binary 1's and 2 binary zeros. The binary 7 starts with two zeros and ends with three 1's. The binary number 14 starts with 1 zero and ends with a zero and has three binary 1's in between. The binary number 28 starts with three 1's and ends with two zeros. Obviously, if a car is proceeding rapidly down a track, the system suddenly sees three binary 1's out of a possible five code location. It would be impossible, if nothing further were done, to determine whether the apparatus had been exposed to the binary number 7, 14 or 28. It is, of course, possible to provide enough code locations to permit a binary 1 to be maintained at the beginning and ending of each word so that no confusion can exist as to where the code begins and ends. However, even with such a system, it may be difficult to determine the locations 1's and zeros within a particular word since the speed of the train may be considerably altered during passage over the detectors or various trains may pass over the detectors at greatly varying speeds and therefore there would be no way for the apparatus to determine when a pulse should be received to indicate a "1" or when no pulse should be received to indicate a zero. For instance, take a number such as 10110010001 which designates the number 1,425. If two trains pass over the detectors at greatly different speeds, then the three zeros on the fast train might require the same time interval to pass the detectors as a single zero on a slow train and therefore the apparatus would have considerable difficulty distinguishing between these two designations. If a train slowed down in passing over the detectors then the two zeros together might take more time, after the train has slowed, to pass the detector, than three zeros which passed when the train was moving rapidly. It is, of course, possible to employ a separate detector and separate sources to produce only clock pulses but this requires a detector in addition to the one which is employed for the purpose of detecting the actual code. However, even such an arrangement as this does not eliminate still a third problem which stems from the fact that freight cars may travel on a track in either of two directions, having actually no preferred direction. The use of designating numbers at the beginning and ending of each word would not cure this defect nor would the use of a separate clock pulse channel.

In accordance with the present invention, a serial code form may be employed by resorting to the apparatus illustrated in FIGURE 3 of the accompanying drawings. In this system two rows of sources 105 and 106 are provided on the freight car and two detectors are employed one for each row of sources. The sources in the two rows are arranged in a one-for-one complementary arrangement as between the two rows; that is, wherever there is a source in the one row, there is a vacancy or no source directly opposite thereto in the other row. One of these rows, and it is immaterial which except for the fact that the system must recognize which row is employed, carries the actual binary number and this information is fed serially into a shift register. For purposes of explanation only, the row of sources 105 establishes the binary code designating the car 1. The two rows are combined to produce clock pulses and binary 1's or sources 107 are located in both rows at the same location at one end of the binary word to indicate which is the correct end and which is the incorrect end.

Referring now specifically to the apparatus of FIGURE 3 a radiation detector 48 for sources 106 is connected through an amplifier 49 and via a lead 51 to one input of an "or" gate 52. The output of the "or" gate is fed via a lead 53 to a shift register 54. The pulses on the lead 53 are employed as the shift pulses for stepping the information through a shift register 54. A detector 56 is employed to detect the actual binary word, represented by the arrangement of sources 105 in one of the rows of sources on the vehicle, and applies the pulses generated in response to passage of each source in its associated row of sources via an amplifier 57 to a lead 58. The lead 58 is connected to an information input lead of an inhibitor gate 59 and the output signal of the inhibitor gate is applied to a lead 61. The lead 61 is connected via a lead 62 to a second input to the "or" gate 52 and is connected via a delay line 63 to an information input lead 64 of the shift register 54. The inhibiting input connection of the inhibitor gate 59 is connected via a lead 66 to a phase-reversed output connection of the amplifier 49; that is, when the output lead 51 from the amplifier 49 goes positive the lead 66 goes negative. The leads 51 and 58 are connected to the input leads of an "and" gate 67 which is connected to apply pulses to one stage of a flip-flop 68. The other stage of the flip-flop is adapted to receive pulses via a lead 69 from the lead 53 on which are developed the shift pulses. The lower stage of the flip-flop 68, as viewed in FIGURE 3, is connected via a lead 71 to one input of an "and" gate 72 having its other input connected via a lead 73 to receive shift-out pulses for purposes to be described subsequently. The upper stage of the flip-flop 68 is connected via a lead 74 to one input of an "and" gate 76 having its other input connected to receive shift-out pulses. The "and" gate 76 develops output pulses on a lead 77 which is connected to the lead 53. The "and" gate 72 applies output pulses to a phase-reversing amplifier 78 which applies phase-reverse pulses on a reverse shift lead 79 of the shift register 54. In consequence of the utilization of the phase-reversed amplifier 78, positive pulses develop in the output circuit of the "and" gate 72 cause negative pulses to be produced on the output lead 79.

In the operation of this circuit, positive pulses developed by the detectors 48 and 56 are applied via their respective amplifiers 49 and 57, leads 51 and 62, and the "or" gate 52 to the lead 53 so that a continuous chain of pulses appears on the lead 53. The pulses on lead 53 are timed precisely to the velocity of the car and therefore operate as synchronizing pulses for operation of the system regardless of the velocity of the train or its change in velocity while proceeding over the detectors. The two pulses which are received simultaneously by the detectors 48 and 56 and which determine the order of the number being received, are applied to the "and" gate 67 and unblock the gate to produce a pulse which actuates the flip-flop 68 so that the lower stage as viewed in FIGURE 3 is rendered conductive. The pulse generated by the detector 56 constitutes no part of the information which is to be fed to the shift register 54 and therefore the inhibitor gate 59 is employed to block the passage of this pulse through the gate to the lead 61 and subsequently to the shift register 54. More specifically, upon the application of a positive pulse to the amplifier 49 regardless of its location in the word or its use as a marker pulse, as opposed to an information pulse, a reduction in voltage occurs on the lead 66 which blocks the inhibitor gate 59 so that no pulses may pass therethrough. The lead 69 applies pulses to the upper stage of the flip-flop 68 and therefore if the pulses which designate one end or the other of the word are received first and the lower stage of the flip-flop is rendered conductive, the pulses subsequently received reset the flip-flop 68 so that the upper tube is conductive. On the other hand, if the indicator pulses are received last then the flip-flop 68 remains with its lower stage conductive and therefore it is seen that depending upon whether these two pulses are received first or last the flip-flop 68 is set in one condition or the other. The delay line 63 is employed to delay slightly the passage of the information on the lead 61 to the register 54 so that the synchronizing pulses on the lead 53 may shift the information in the register to make room for each subsequent bit of information applied to the system.

As soon as all of the information has been received by the shift register 54, shift-out pulses are applied to the leads 75 and 73 via a lead 50 and therefore to the "and" gates 72 and 76. Only one of these gates, as determined by the condition of the flip-flop 68 is primed to pass pulses and if the lower stage of the flip-flop stage is conductive, then the gate 76 is open and positive pulses are applied to the lead 53 which shifts the information out of the shift register in a forward direction on a lead 81. The diode 80 prevents shift pulses on lead 77 from affecting the flip-flop 68. Conversely, if the upper stage of the flip-flop 68 is rendered conductive, the lead 71 is energized and the gate 72 passes the shift out pulses to the amplifier 78. The amplifier 78 develops negative pulses on the lead 79 which effect reversal of the shifting direction of the shift register 54 so that the output information from the register 54 appears on an output lead 82 in reverse order, timewise, from the order in which they were placed in the shift register. Therefore, in the system specifically illustrated, if the two pulses which designate a specific end of the word are received last, the word is correct, as received, and appears on the output lead 81 in the same order in which it is applied to the shift register 54. Conversely, if the two pulses appeared at the beginning of the information, then the gate 72 would be open thereby indicating that the information was read-in in reverse order and is now read-out on the lead 82 in a direction which is the reverse of the order in which it was received. The leads 82 and 81 are applied to inputs of the "or" gate 83 which produces pulses on an output lead 84.

The information appearing on the lead 84 is now correct in every sense in respect to direction and word content or information content and may be applied serially directly to an electronic computer for subsequent operation thereupon.

It is not intended to limit the scope of the present invention to the utilization of the serial arrangement illustrated in FIGURE 3, since systems using just a single row of radiation sources may be employed so long as the velocity of the train is held constant in passing over the detector and the velocity of all trains is maintained substantially the same. In such a system a clock pulse generator may be triggered, by the passage of each car, by appropriate pick-up means and each number employed may begin and end with a binary 1. As to the order in which the word is received, a source located at one end of the car and removed a predetermined distance greater or lesser than the normal spacing between the sources from the information sources may be employed to tag the proper end of the word. However, the arrangement shown in FIGURE 3 is found to be a convenient method for solving all of the problems inherent in a synchronous and reversible operation presented by the prevailing condition of the system.

As previously indicated in reference to FIGURE 1, the sources which are illustrated diagrammatically as 9 through 13, are employed to direct a narrow beam of radiation toward each of the detectors. Various types of sources of radiation may be employed but it is felt that gamma-ray sources are preferable since dirt, snow, weather conditions and flying particles have substantially no affect upon the passage of radiation from the source to the detector. The use of gamma ray emitting material is, of course, somewhat dangerous and therefore a lead container may be employed as illustrated in FIGURE 4 of the accompanying drawings. There is provided a generally T-shaped container 85 having a cross arm portion 86 and a leg portion 87. The cross arm 86 is adapted to be bolted to the underside of the vehicle and the leg portion 87 is provided with a conical, centrally-located, aperture 88 in the bottom of which is disposed a radiation source 89. The source would have an intensity of a few millicuries at most and the relative thickness of the walls of the leg 87 and the base 86 prevent any appreciable amount of radiation from escaping from the source 89 other than through the conical aperture 88 which directs a narrow beam of radiation toward the source.

The only danger from the source holder 85, as illustrated in FIGURE 4, would be to an individual lying directly thereunder and it is possible that workmen in working under the cars might pass under the apertures 88 and be subjected to the radiation. The amount of radiation involved is not great, but it is desirable to prevent even a small amount of radiation from reaching the workers. In order to eliminate all undesired exposure, the arrangement illustrated in FIGURES 5 and 6 may be employed. In these figures there is provided a container again having a cross arm 91 adapted to be secured to the underside of the vehicle and having a leg 92 with a conical aperture 93. A source 94 is placed at the upper end or apex of the conical aperture and a sliding shield 96 is adapted to be disposed across the bottom of the aperture 93. The sliding shield 96 is retained between two angle members 97 and 98 which permit sliding movement of the field 96 in one direction across the bottom of the leg 92 but holds the shield in other directions. The shield 96 is adapted to be moved by a solenoid 99 which is supported on the source holder by means of a bracket 101. An armature 102 of the solenoid 99 is connected to the sliding shield 96 and upon energization of the solenoid the shield is slid toward the solenoid and uncovers the aperture 93 permitting the radiation from the source 94 to be directed downwardly against an appropriate detector. The solenoid 99 may be energized in a number of ways and one way would be to employ normal train signalling systems which when the train entered a particular block would energize all of the solenoids on a train. Similarly, individual transducers on each car may energize the solenoids of that car upon reaching a predetermined position with respect to the detectors as determined by a powerful permanent magnet or radiation generator. Thus, the system may be rendered completely safe with respect to harmful emanation from the sources 94.

The invention is described as employing shift register storage elements but it is to be understood that other storage arrangements may be employed. For instance, in FIGURE 4 a magnetic tape may be employed and the direction of its playback may be controlled by the flip-flop 68.

While I have described and illustrated three specific embodiments of my invention, it will be clear that variations of the details of construction which are specifically illustrated and described may be resorted to without departing from the true spirit and scope of the invention as defined in the appended claims.

What is claimed is:

1. In combination an object movable over a predetermined location, a plurality of spaced distinct regions arranged along said object, energy radiating means disposed at predetermined various ones of said distinct regions, energy detector means located at said predetermined location, said distinct regions being located with respect to said energy detecting means such that all of said energy radiating means are presented to said detector means, said distinct regions being arranged in two parallel rows, and wherein said energy detector means comprise two such means each arranged to sense said energy radiating means in a different one of said rows, said detector means producing pulses in response to said radiating means, said energy radiating means being disposed in complementary locations in said rows so as to produce only one pulse for each pair of distinct regions.

2. The combination according to claim 1 further comprising means for combining signal pulses produced by each of said energy detector means to produce a clock pulse train, a storage medium having distinct signal storage locations and means responsive to said clock pulse train to sequence signals indicative of presentation of radiating means to one of said energy detector means to said signal storage locations of said storage medium.

3. The combination acording to claim 1 further comprising means for decoding said pulses to produce an indication of the information represented by the arrangement of sources.

4. The combination according to claim 3 wherein said means for decoding comprises a diode matrix and a shift register for feeding said matrix.

5. The combination according to claim 2 further comprising a pair of energy radiating means arranged at one end of each of said rows of regions in corresponding locations therein, and means responsive to the order of appearance of said last mentioned radiating means relative to the other of said radiating means for determining the order in which information stored in said storage medium is read out therefrom.

6. In combination an object movable relative to a predetermined location, at least a first plurality of spaced distinct regions arranged serially along said body, energy radiating means disposed at predetermined ones of said distinct regions, energy detector means located at said predetermined location such that said distinct regions are serially presented to said detector means, a shift register having a shift input terminal and an information input terminal, means for developing a control signal as each of said distinct regions appears at said predetermined location, circuit means for applying said control signals to said shift input terminal of said shift register, second circuit means for developing an information signal as each of said energy radiating means is presented to said energy detecting means, said second circuit means applying said information signals to said information input terminal of said shift register.

7. The combination according to claim 6 wherein said means for developing said shift signals comprises two rows of said distinct regions, a complementary arrangement of energy radiating means in said distinct regions of said rows, one of said rows comprising said first plurality of said distinct regions, a second energy detector means for interrogating said other of said rows of distinct regions, means for producing control signals as each of said energy detecting means of said other row of said distinct regions is presented to said second energy detector means, and means for combining said control and said information signals.

8. The combination according to claim 7 wherein said shift register is a reversible shift register, said shift register having first and second output terminals and a further shift terminal, a pair of energy radiating means located in different ones of said rows, said pair of radiating means being presented concurrently to different ones of said detector means, means for developing a routing signal indicative of the order of presentation of said pair of radiating means to said detector means relative to the presentation of the other of said radiating means to said detector means, and means responsive to said routing signal for applying output control signals to one or the other of said shift terminals.

9. In combination, an object movable relative to a predetermined location, at least a first plurality of spaced distinct regions arranged along said object, energy radiating means disposed at predetermined ones of said distinct regions, energy detector means located at said predetermined location such that said predetermined regions are serially presented to said detector means, an information storage means having distinct signal storage locations, said storage means including control signal responsive means for sequencing information signals to said signal storage locations, means for developing a control signal as each of said distinct regions appears at said predetermined location, circuit means for applying said control signals to said control signal responsive means, second circuit means for developing an information signal as each of said energy radiating means is presented to said energy detecting means, said second circuit means applying said information signals to said information storage means.

10. In combination, an object movable relative to a predetermined location, at least a first plurality of spaced distinct regions arranged along said object, energy detector means located at said predetermined location such that said distinct regions are serially presented to said detector means upon movement of said object, first code means disposed at predetermined ones of said distinct regions for changing the quantity of radiant energy incident upon said detector means as each code means is presented to said detector means, an information storage means having signal storage locations, said storage means including control signal responsive means for controlling the application of information signals to said signal storage locations, means for developing a control signal as each of said distinct regions appears at said predetermined location, circuit means for applying said control signals to said control signal responsive means, second circuit means for developing an information signal as each of said code means is presented to said energy detecting means, said second circuit means applying said information signals to said information storage means.

11. The combination according to claim 10 further comprising additional code means disposed at one end of said first code means, means for developing a routing signal indicative of the order of presentation to said detector of said additional code means relative to the presentation of said first code means to said detector means, and means responsive to said routing signal to determine the order in which said information signals are to be abstracted from said storage means.

12. In combination, an object movable relative to a predetermined location, at least a first plurality of spaced distinct regions arranged along said object, energy detector means located at said predetermined location such that said distinct regions are serially presented to said detector means upon movement of said object, first code means disposed at predetermined ones of said distinct regions for changing the quantity of radiant energy incident upon said detector means as each code means is presented to said detector means, second code means arranged such that the order of presentation to said detector means of said second code means relative to said first code means is determined by the direction of movement of said object, an information storage means having a plurality of signal storage locations, said energy detector means developing a signal upon the presentation thereto of each of said code means, means for storing each of the signals generated in response to the presentation of said first code means to said detector means in a distinct location in said information storage means, means responsive to the order of presentation to said detector means of said second code means relative to said first code means for developing a routing signal indicative of the said order of presentation, and means responsive to said routing signal to determine the order in which said information signals are to be abstracted from said storage means.

References Cited in the file of this patent

UNITED STATES PATENTS

| 2,355,544 | McGowan | Aug. 8, 1944 |
| 2,414,472 | Loughridge | Jan. 21, 1947 |
| 2,620,435 | Vogt et al. | Dec. 2, 1952 |
| 2,674,732 | Robbins | Apr. 6, 1954 |
| 2,877,718 | Mittag | Mar. 17, 1959 |

FOREIGN PATENTS

| 800,190 | Great Britain | Aug. 20, 1958 |
| 807,343 | Great Britain | Jan. 14, 1959 |

Notice of Adverse Decision in Interference

In Interference No. 95,936 involving Patent No. 3,117,754, K. H. Morganstern, Vehicle identification system, final judgment adverse to the patentee was rendered Jan. 3, 1969, as to claims 1, 2, 3, 6, 7, 9 and 10.

[*Official Gazette March 11, 1969.*]